(12) United States Patent
Shin

(10) Patent No.: US 11,761,633 B2
(45) Date of Patent: Sep. 19, 2023

(54) COMBUSTOR NOZZLE, COMBUSTOR, AND GAS TURBINE INCLUDING THE SAME

(71) Applicant: DOOSAN ENERBILITY CO., LTD., Changwon-si (KR)

(72) Inventor: Young Jun Shin, Seongnam (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/512,678

(22) Filed: Oct. 28, 2021

(65) Prior Publication Data
US 2022/0196242 A1 Jun. 23, 2022

(30) Foreign Application Priority Data
Dec. 22, 2020 (KR) .................. 10-2020-0181141

(51) Int. Cl.
*F23R 3/28* (2006.01)
*F23D 14/06* (2006.01)
(Continued)

(52) U.S. Cl.
CPC .............. *F23R 3/286* (2013.01); *F02C 3/22* (2013.01); *F02C 9/40* (2013.01); *F23D 14/065* (2013.01);
(Continued)

(58) Field of Classification Search
CPC .. F23R 3/286; F23R 3/343; F23R 3/34; F23R 3/22; F23R 3/28; F23R 3/283; F23R 3/30; F23R 3/36; F23R 3/32; F02C 7/22; F02C 9/40; F23D 2900/00003; F23D 14/02; F23D 14/06–065; F23D 11/005–007; F23D 11/101–107; F23D 11/12; F23D 11/28
See application file for complete search history.

(56) References Cited

U.S. PATENT DOCUMENTS 5,479,782 A * 1/1996 Parker ..................... F23R 3/14
60/747
5,983,642 A * 11/1999 Parker ..................... F23R 3/286
60/737
(Continued)

FOREIGN PATENT DOCUMENTS

CN 103388530 A 11/2013
JP 2017146087 A 8/2017
(Continued)

OTHER PUBLICATIONS

CN Office Action, dated Jan. 28, 2023.

*Primary Examiner* — Jason H Duger
*Assistant Examiner* — Jingchen Liu
(74) *Attorney, Agent, or Firm* — Harvest IP Law, LLP

(57) ABSTRACT

A nozzle for a combustor burning a hydrogen-containing fuel is provided. The nozzle includes a first tube through which the fuel flows and having a fuel injection hole on a front side to inject the fuel therethrough, a second tube surrounding the first tube and having a premixing injection hole through which the fuel and air are mixed and discharged, and a third tube surrounding the second tube and through which the fuel flows, wherein the second tube includes a plurality of fine injection holes to inject the fuel from the third tube to form fine flames, and the fine injection holes are spaced apart from each other in a circumferential direction of the second tube.

10 Claims, 8 Drawing Sheets

(51) Int. Cl.
  *F02C 3/22* (2006.01)
  *F02C 9/40* (2006.01)
  *F23R 3/34* (2006.01)
  *F23R 3/06* (2006.01)
  *F23R 3/18* (2006.01)

(52) U.S. Cl.
  CPC .... *F23R 3/343* (2013.01); *F23D 2900/00003* (2013.01)

(56) References Cited

U.S. PATENT DOCUMENTS

| | | | | |
|---|---|---|---|---|
| 7,143,583 B2* | 12/2006 | Hayashi | ............ | F23R 3/18 60/737 |
| 7,762,073 B2* | 7/2010 | Li | ............ | F23R 3/14 60/737 |
| 8,015,815 B2* | 9/2011 | Pelletier | ............ | F23R 3/14 60/742 |
| 10,012,388 B2* | 7/2018 | Saha | ............ | F23D 11/10 |
| 10,215,415 B2* | 2/2019 | Stewart | ............ | F23R 3/283 |
| 10,330,204 B2* | 6/2019 | Clemen | ............ | F16J 15/44 |
| 2004/0226297 A1 | 11/2004 | Griffin | | |
| 2010/0218501 A1* | 9/2010 | York | ............ | F23D 14/02 60/737 |
| 2013/0019584 A1* | 1/2013 | Koizumi | ............ | F23R 3/343 60/39.463 |
| 2013/0086910 A1 | 4/2013 | Khan | | |
| 2013/0298562 A1* | 11/2013 | Cai | ............ | F23R 3/286 60/737 |
| 2014/0338339 A1* | 11/2014 | Westmoreland | ............ | F23R 3/286 60/737 |
| 2016/0252254 A1* | 9/2016 | Böttcher | ............ | F23R 3/286 60/39.463 |
| 2017/0268784 A1 | 9/2017 | Crawley | | |

FOREIGN PATENT DOCUMENTS

| | | |
|---|---|---|
| KR | 19990054621 A | 5/2000 |
| KR | 20150085748 A | 7/2015 |
| KR | 20190109955 A | 9/2019 |

* cited by examiner

COMBUSTOR NOZZLE, COMBUSTOR, AND GAS TURBINE INCLUDING THE SAME

CROSS REFERENCE TO RELATED APPLICATION

This application claims priority to Korean Patent Application No. 10-2020-0181141, filed on Dec. 22, 2020, the entire disclosure of which is incorporated herein by reference in its entirety.

BACKGROUND

1. Field

Apparatuses and methods consistent with exemplary embodiments relate to a combustor nozzle, a combustor, and a gas turbine and, more particularly, to a combustor nozzle using fuel containing hydrogen, a combustor, and a gas turbine including the same.

2. Description of the Related Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine includes a compressor, a combustor, and a turbine. The compressor serves to intake external air, compress the air, and transfer the compressed air to the combustor. The compressed air compressed by the compressor has a high temperature and a high pressure. The combustor serves to mix compressed air compressed by the compressor and fuel and combust the mixture of compressed air and fuel to produce combustion gas discharged to the gas turbine. The combustion gas drive turbine blades in the turbine to produce power. The generated power is applied to a variety of fields such as generation of electricity, driving of mechanical units, etc.

Fuel is injected through nozzles disposed in each combustor, and the fuel includes gas fuel and liquid fuel. In recent years, to reduce the emission of carbon dioxide, it is recommended to use hydrogen fuel or a fuel containing hydrogen.

However, because hydrogen has a high combustion rate, when such fuels are burned with a gas turbine combustor, the flame formed in the gas turbine combustor approaches the structure of the gas turbine combustor and is heated, thereby reducing the reliability of the gas turbine combustor. However, if hydrogen is injected at a high speed to solve this problem, the flame is ejected and it is difficult to maintain the flame stably.

SUMMARY

Aspects of one or more exemplary embodiments provide a combustor nozzle capable of stably maintaining flame generated using fuel containing hydrogen, a combustor, and a gas turbine including the same.

Additional aspects will be set forth in part in the description which follows and, in part, will become apparent from the description, or may be learned by practice of the exemplary embodiments.

According to an aspect of an exemplary embodiment, there is provided a nozzle for a combustor burning a hydrogen-containing fuel, the nozzle including: a first tube through which the fuel flows and having a fuel injection hole on a front side to inject the fuel therethrough; a second tube surrounding the first tube and having a premixing injection hole through which the fuel and air are mixed and discharged; and a third tube surrounding the second tube and through which the fuel flows, wherein the second tube includes a plurality of fine injection holes to inject the fuel from the third tube to form fine flames, and the fine injection holes are spaced apart from each other in a circumferential direction of the second tube.

The first tube may include an accelerating injector whose inner diameter gradually decreases toward the tip, and the fuel injection hole may be formed at the tip of the accelerating injector.

The second tube may include an injection guide surrounding the accelerating injector and whose inner diameter gradually decreases toward the tip, and the fine injection holes may be formed in the injection guide.

The third tube may include an internal expansion space surrounding the injection guide and whose cross-sectional area gradually increases toward the tip.

The nozzle may further include a fourth tube surrounding the third tube and through which a cooling air flows, wherein the fourth tube may include a plurality of air injection holes at the tip.

The second tube may include a flared expansion tube extending outwardly at the tip, and the fine injection holes may be formed in the extension tube.

The extension tube may further extend forward from the tip of the first tube.

The third tube may include an internal injection space surrounding the expansion tube and whose cross-sectional area gradually decreases toward the tip.

The third tube may include a tip plate at the tip and an auxiliary injection hole formed in the tip plate to produce a fine flame.

According to an aspect of another exemplary embodiment, there is provided a combustor including: a burner having a plurality of nozzles configured to inject fuel and air; and a duct assembly coupled to one side of the burner to combust a mixture of the fuel and air and transmit combustion gas to a turbine, wherein each of the plurality of nozzles including: a first tube through which fuel flows and having a fuel injection hole on a front side to inject the fuel therethrough; a second tube surrounding the first tube and having on a front side a premixing injection hole through which the fuel and air are mixed; and a third tube surrounding the second tube and through which the fuel flows, wherein the second tube includes a plurality of fine injection holes to inject the fuel from the third tube to form fine flames, and the fine injection holes may be spaced apart from each other in a circumferential direction of the second tube.

The first tube may include an accelerating injector whose inner diameter gradually decreases toward the tip, and the fuel injection hole may be formed at the tip of the accelerating injector.

The second tube may include an injection guide surrounding the accelerating injector and whose inner diameter gradually decreases toward the tip, and the fine injection holes may be formed in the injection guide.

The third tube may include an internal expansion space surrounding the injection guide and whose cross-sectional area gradually increases toward the tip.

The nozzle may further include a fourth tube surrounding the third tube and through which a cooling air flows, wherein the fourth tube includes a plurality of air injection holes at the tip.

The second tube may include a flared expansion tube extending outwardly at the tip, and the fine injection holes may be formed in the extension tube.

The extension tube may further extend forward from the tip of the first tube.

The third tube may include an internal injection space surrounding the expansion tube and whose cross-sectional area gradually decreases toward the tip.

The third tube may include a tip plate at the tip and an auxiliary injection hole formed in the tip plate to produce a fine flame.

According to an aspect of another exemplary embodiment, there is provided a gas turbine including: a compressor configured to compress an air introduced from an outside; a combustor configured to mix the air compressed by the compressor with fuel and combust an air-fuel mixture to produce high-temperature and high-pressure combustion gas; and a turbine having a plurality of turbine blades rotated by the combustion gas produced from the combustor, wherein the combustor including: a burner having a plurality of nozzles configured to inject fuel and air; and a duct assembly coupled to one side of the burner to combust a mixture of the fuel and air and transmit combustion gas to the turbine, wherein each of the plurality of nozzles including: a first tube through which fuel flows and having a fuel injection hole on a front side to inject the fuel therethrough; a second tube surrounding the first tube and having on a front side a premixing injection hole through which the fuel and air are mixed; and a third tube surrounding the second tube and through which the fuel flows, wherein the second tube includes a plurality of fine injection holes to inject the fuel from the third tube to form fine flames, and the fine injection holes may be spaced apart from each other in a circumferential direction of the second tube.

The first tube may include an accelerating injector whose inner diameter gradually decreases toward the tip, the second tube includes an injection guide surrounding the accelerating injector and whose inner diameter gradually decreases toward the tip, and the fine injection holes may be formed in the injection guide.

The combustor nozzle according to one or more exemplary embodiments, fine injection holes are formed to form fine flames, thereby protecting the main flame formed by the fuel injected from the first tube using the fine flames and thus stably maintaining the main flame.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
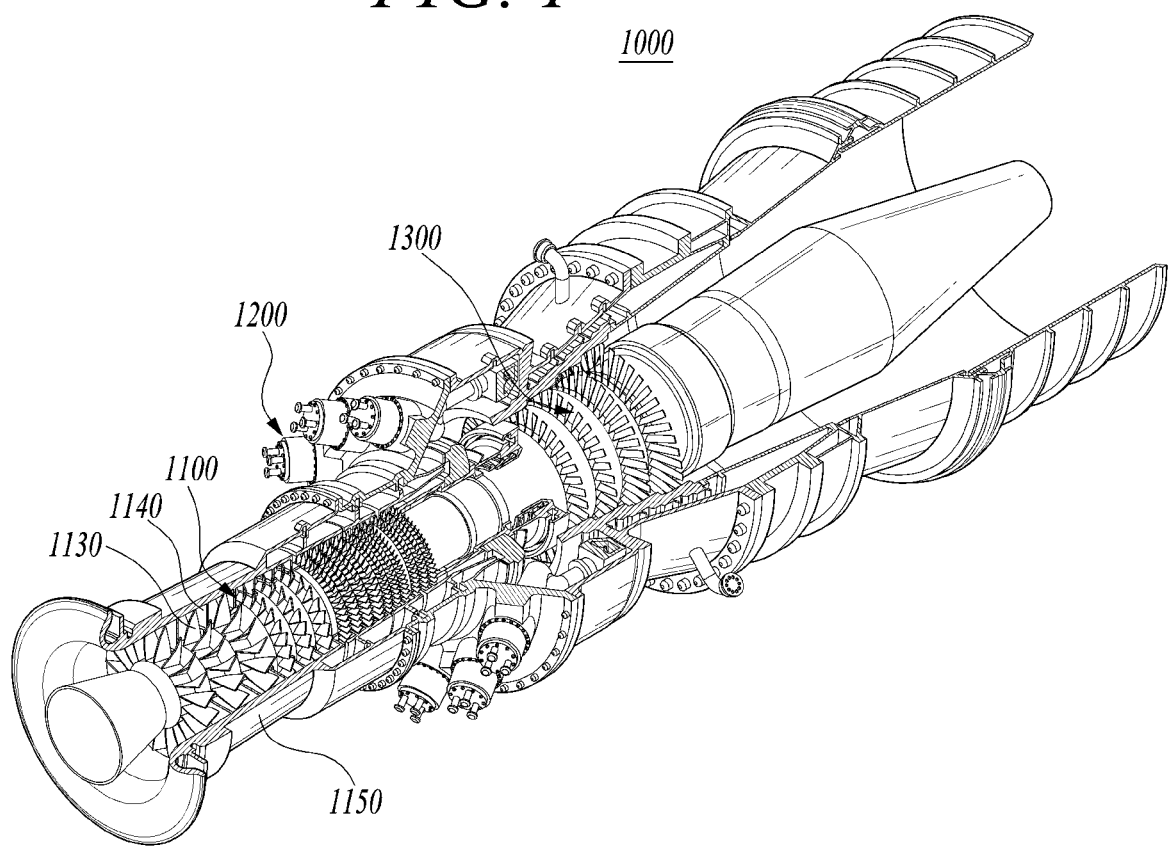
FIG. 1 is a view illustrating an interior of a gas turbine according to a first exemplary embodiment.

Various modifications and various embodiments will be described in detail with reference to the accompanying drawings. However, it should be noted that the various embodiments are not for limiting the scope of the disclosure to the specific embodiment, but they should be interpreted to include all of modifications, equivalents or substitutions of the embodiments included within the spirit and scope disclosed herein.

Terms used herein are used to merely describe specific embodiments, and are not intended to limit the scope of the disclosure. As used herein, an element expressed as a singular form includes a plurality of elements, unless the context clearly indicates otherwise. Further, it will be understood that the terms "including" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, exemplary embodiments will be described in detail with reference to the accompanying drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Hereinafter, a gas turbine according to a first exemplary embodiment will be described with reference to the accompanying drawings.

Figure 2:
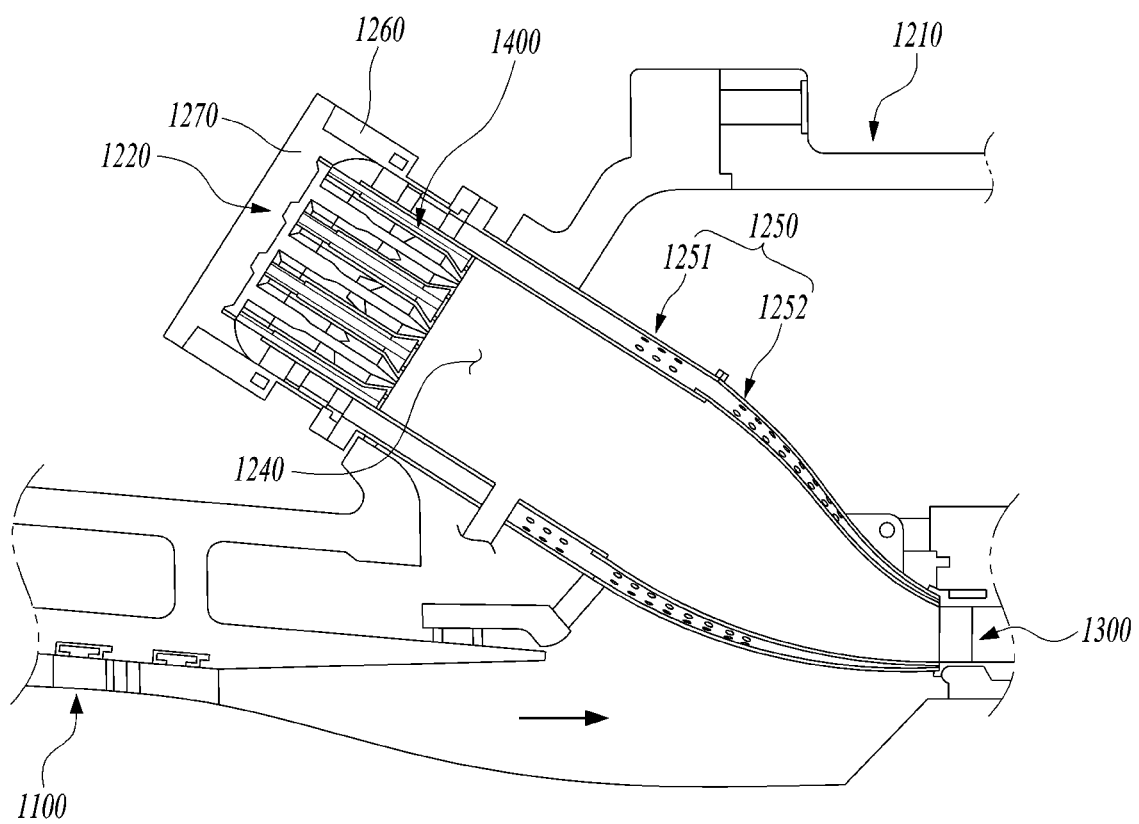
FIG. 2 is a view illustrating a combustor of FIG. 1.

FIG. 1 is a view illustrating an interior of a gas turbine according to an exemplary embodiment, and FIG. 2 is a view illustrating a combustor of FIG. 1.

An ideal thermodynamic cycle of a gas turbine 1000 may ideally comply with the Brayton cycle. The Brayton cycle consists of four thermodynamic processes: isentropic compression (i.e., an adiabatic compression) process, isobaric combustion process, isentropic expansion (i.e., an adiabatic expansion) process and isobaric heat ejection process. That is, in the Brayton cycle, thermal energy may be released by combustion of fuel in an isobaric environment after atmospheric air is sucked and compressed into high pressure air, hot combustion gas may be expanded to be converted into kinetic energy, and exhaust gas with residual energy may be discharged to the outside. As such, the Brayton cycle consists of four thermodynamic processes including compression, heating, expansion, and exhaust.

The gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may supply the compressed air by compressor blades 1130 to a combustor 1200 and also supply the cooling air to a high temperature region of the gas turbine 1000. Here, because the sucked air is compressed in the compressor 1100 through an adiabatic compression process, the pressure and temperature of the air passing through the compressor 1100 increases.

The compressor 1100 may be designed in the form of a centrifugal compressor or an axial compressor, and the centrifugal compressor is applied to a small-scale gas turbine, whereas a multi-stage axial compressor is applied to a large-scale gas turbine 1000 illustrated in FIG. 1 to compress a large amount of air. In the multi-stage axial compressor 1100, the compressor blades 1130 rotate according to the rotation of rotor disks, compress the introduced air and move the compressed air to compressor vanes 1140 disposed at a following stage. The air is compressed gradually to a high pressure while passing through the compressor blades 1130 formed in multiple stages.

The compressor vanes 1140 are mounted inside a housing 1150 in such a way that a plurality of compressor vanes 1140 form each stages. The compressor vanes 1140 guide the compressed air moved from compressor blades 1130 disposed at a preceding stage toward compressor blades 1130 disposed at a following stage. For example, at least some of the compressor vanes 1140 may be mounted so as to be rotatable within a predetermined range, e.g., to adjust an air inflow.

The compressor 1100 may be driven using a portion of the power output from the turbine 1300. To this end, as illustrated in FIG. 1, a rotary shaft of the compressor 1100 and a rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The combustor 1200 may mix the compressed air supplied from an outlet of the compressor 1100 with fuel and combust the mixture at constant pressure to produce hot combustion gas with high energy. FIG. 2 illustrates an example of the combustor 1200 provided in the gas turbine 1000. The combustor 1200 may include a combustor casing 1210, burners 1220 circumferentially arranged around the gas turbine 1000, and a duct assembly 1250. In addition, each of the burners 1220 includes a plurality of nozzles 1400, a head end plate 1270, and a nozzle casing 1260.

The gas turbine 1000 may use gas fuel, liquid fuel, or a combination thereof. In order to create a combustion environment for reducing emissions such as carbon monoxides, or nitrogen oxides, there is a recent trend to apply to a gas turbine a premixed combustion scheme that is advantageous in reducing emissions through lowered combustion temperature and homogeneous combustion even though it is difficult to control the premixed combustion.

In premixed combustion, compressed air is mixed with fuel sprayed from the nozzles 1400 in advance, and then enters a combustion chamber 1240. When the premixed gas is initially ignited by an ignitor and then a combustion state is stabilized, the combustion state is maintained by supplying fuel and air.

Referring to FIG. 2, the duct assembly 1250 is provided to connect a section between the burners 1220 and the turbine 1300 so that the compressed air flows along an outer surface of the duct assembly 1250, along which the hot combustion gas flows to heat the duct assembly 1250, thereby properly cooling the heated duct assembly 1250.

The combustor casing 1210 may have an approximately cylindrical shape in which the burners 1220 are surrounded. The burner 1220 is disposed downstream of the compressor 1100 and may be disposed along the annular combustor casing 1210. Each burner 1220 includes a plurality of nozzles 1400, through which fuel is injected and mixed with air in an appropriate ratio to form a fuel-air mixture having conditions suitable for combustion.

The gas turbine 1000 may use a gas fuel, for example, a fuel containing hydrogen. The fuel may include a hydrogen fuel or a fuel containing hydrogen and natural gas.

The duct assembly 1250 may include a liner 1251 and a transition piece 1252. The liner 1251 is a tube member connected to the burners 1220 of the combustor 1200, and the combustion chamber 1240 is an internal space of the liner 1251. The liner 1251 has one longitudinal end coupled to the burner 1220 and the other longitudinal end coupled to the transition piece 1252.

The transition piece 1252 is connected an inlet of the turbine 1300 to guide the high-temperature combustion gas toward the turbine 1300. The transition piece 1252 has one longitudinal end coupled to the liner 1251 and the other longitudinal end coupled to the turbine 1300.

The nozzle casing 1260 is coupled to an end of the duct assembly 1250, and the head end plate 1270 is coupled to the nozzle casing 1260 to support the nozzles 1400.

Figure 3:
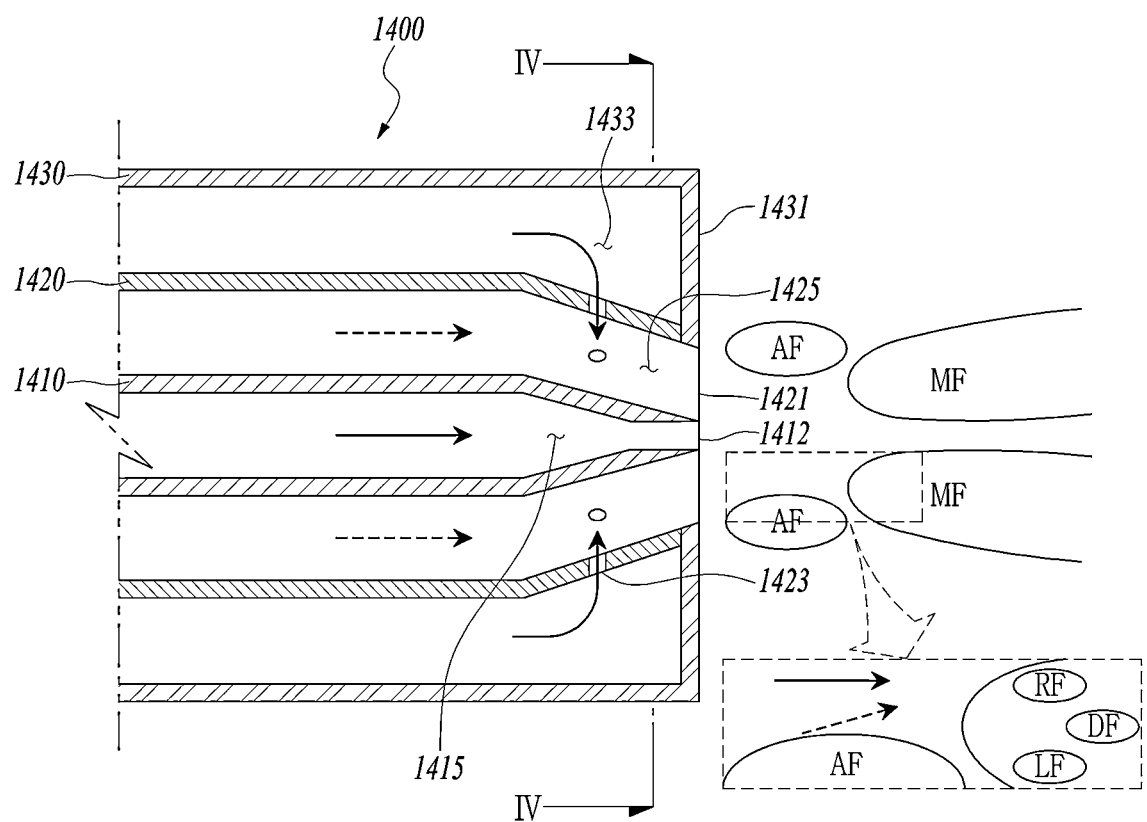
FIG. 3 is a view illustrating a nozzle cut along a longitudinal direction according to the first exemplary embodiment.
Figure 4:
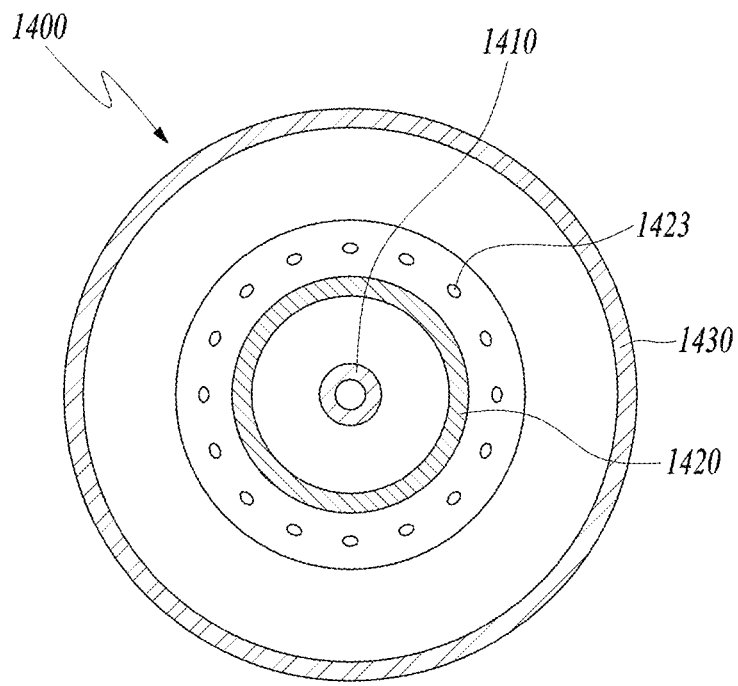
FIG. 4 is a view taken along line IV-IV in FIG. 3.

FIG. 3 is a view illustrating a nozzle cut along a longitudinal direction according to the first exemplary embodiment, and FIG. 4 is a view taken along line IV-IV in FIG. 3.

Referring to FIGS. 3 and 4, the nozzle 1400 may include a first tube 1410 through which fuel flows, a second tube 1420 surrounding the first tube 1410, and a third tube 1430 surrounding the second tube 1420. Here, the fuel may be a gas containing hydrogen.

The first tube 1410 may include an accelerating injector 1415 whose inner diameter gradually decreases toward a tip thereof. A fuel injection hole 1412 for injecting fuel is formed on a front side of the first tube 1410, and the fuel injection hole 1412 may be formed at a front end of the accelerating injector 1415. Hydrogen or gas fuel containing hydrogen may be supplied to the first tube 1410, and the fuel is injected through the fuel injection hole 1412.

The second tube 1420 surrounds the first tube 1410 to provide a passage through which air flows. A premixing injection hole 1421 is formed on a front side of the second tube 1420, and fuel and air may be injected into the premixing injection hole 1421. Air is supplied to the inside of the second tube 1420, and the fuel supplied from the third tube 1430 is mixed with air in the second tube 1420.

The second tube 1420 includes an injection guide 1425 surrounding the accelerating injector 1415 and whose inner diameter gradually decreases toward the tip thereof and through which fuel flows with air. The second tube 1420 is provided with a plurality of fine injection holes 1423 through which fuel is injected from the third tube 1430 to form fine flames. The fine injection holes 1423 may be spaced apart from the second tube 1420. The injection guide 1425 may be formed in a donut-shaped space, and the fine injection hole 1423 may be connected to the injection guide 1425.

The third tube 1430 surrounds the second tube 1420 to provide a passage through which the fuel flows. The third tube 1430 may include a tip plate 1431 formed at a tip and an internal expansion space 1433 that surrounds the injection guide 1425 and gradually increases in cross-sectional area toward the tip. The fine injection holes 1423 are connected to the expansion space 1433 to supply fuel to the second tube 1420.

The fuel injected from the first tube 1410 forms a main flame MF including a rich flame RF, a lean flame LF, and a diffusion flame DF. The rich flame RF is a flame that occurs in a part with an equivalence ratio greater than 1, the lean flame LF is a flame that occurs in a part with an equivalence ratio less than 1, and the diffusion flame DF is a flame that occurs in a part with an equivalence ratio close to 1.

Fuel containing hydrogen is highly reactive and has a high potential for flashback, so the fuel needs to be injected at a high speed to prevent flashback. However, when the fuel is injected at a high speed, the flame may be ejected while moving away from the fuel injection hole 1412. According to the exemplary embodiment, the nozzle 1400 includes fine injection holes 1423 through which fuel is injected to form fine flames AF to connect the fuel injection hole 1412 and the main flame MF, thereby preventing the main flame MF from being separated from the fuel injection hole 1412.

Figure 5:
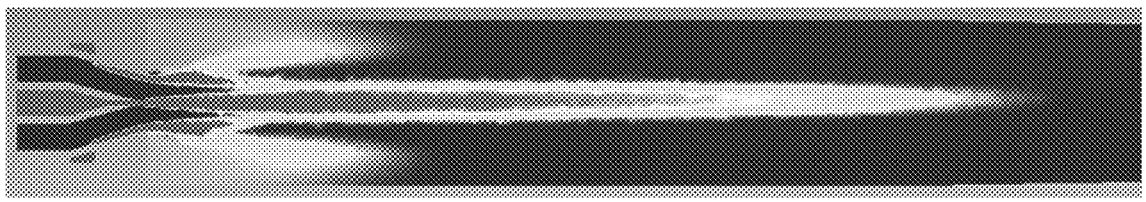
FIG. 5 is a view illustrating combustion of hydrogen in the nozzle according to the first exemplary embodiment.
Figure 6:
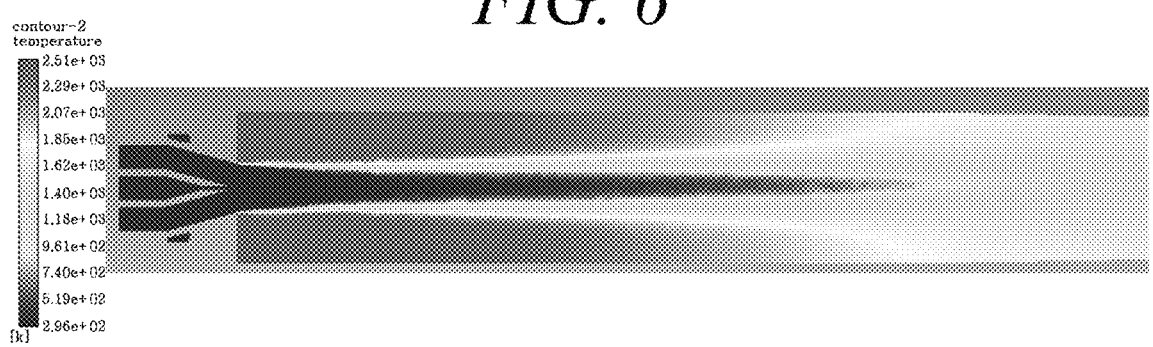
FIG. 6 is a diagram illustrating a temperature distribution of the nozzle according to the first exemplary embodiment.

FIG. 5 is a view illustrating combustion of hydrogen in the nozzle according to the first exemplary embodiment, and FIG. 6 is a diagram illustrating a temperature distribution of the nozzle according to the first exemplary embodiment.

As shown in FIG. 5, it can be seen that hydrogen injected through the fine injection holes 1423 forms fine flames AF around the main flame MF, and as illustrated in FIG. 6, the temperature rise occurs around the main flame MF due to combustion of the fine flames AF. Therefore, fine flames AF are generated in small sizes adjacent to the main flame MF to connect the tip of the nozzle 1400 and the main flame MF, thereby stably maintaining the main flame MF by the fine flames AF.

Figure 7:
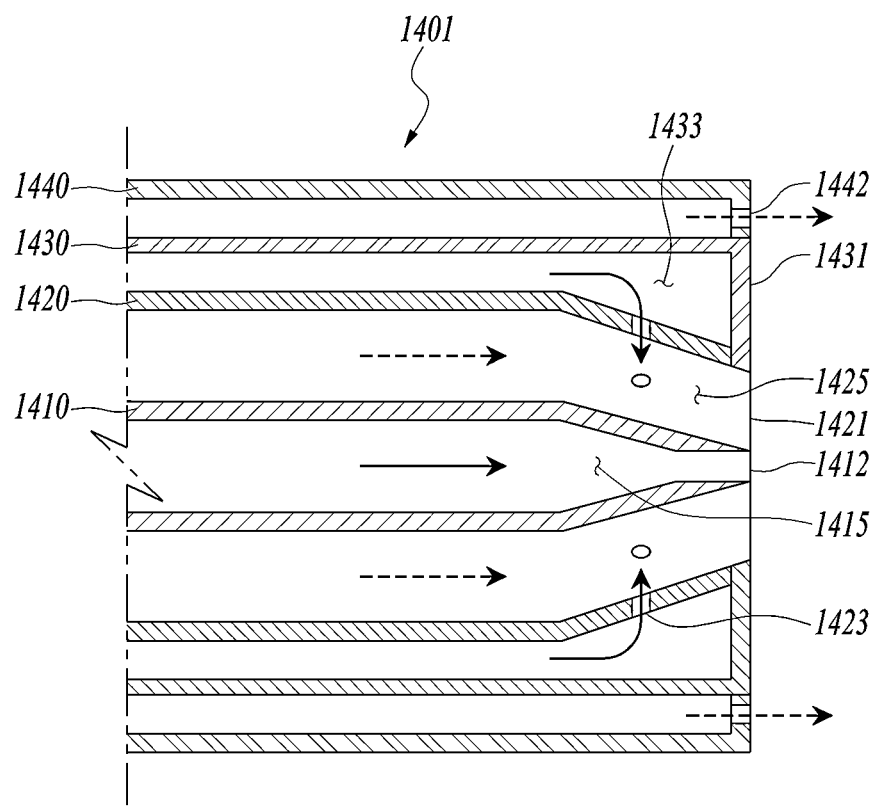
FIG. 7 is a view illustrating a nozzle cut along the longitudinal direction according to a second exemplary embodiment.

Hereinafter, a nozzle according to a second exemplary embodiment will be described. FIG. 7 is a view illustrating the nozzle cut along a longitudinal direction according to the second exemplary embodiment.

Referring to FIG. 7, because the nozzle 1401 according to the second exemplary embodiment has the same structure as the nozzle 1400 according to the first exemplary embodiment except for a fourth tube 1440, a redundant description of the same configuration will be omitted.

The nozzle 1401 may further include a fourth tube 1440 surrounding the third tube 1430. The fourth tube 1440 includes an internal passage through which air flows, and an air injection hole 1442 is formed at the tip so that air can be injected. The air injected through the fourth tube 1440 cools the fourth tube 1440 and the third tube 1430, and the air discharged from the fourth tube 1440 cools the nozzle 1400, thereby preventing thermal deterioration of the nozzle 1400.

Figure 8:
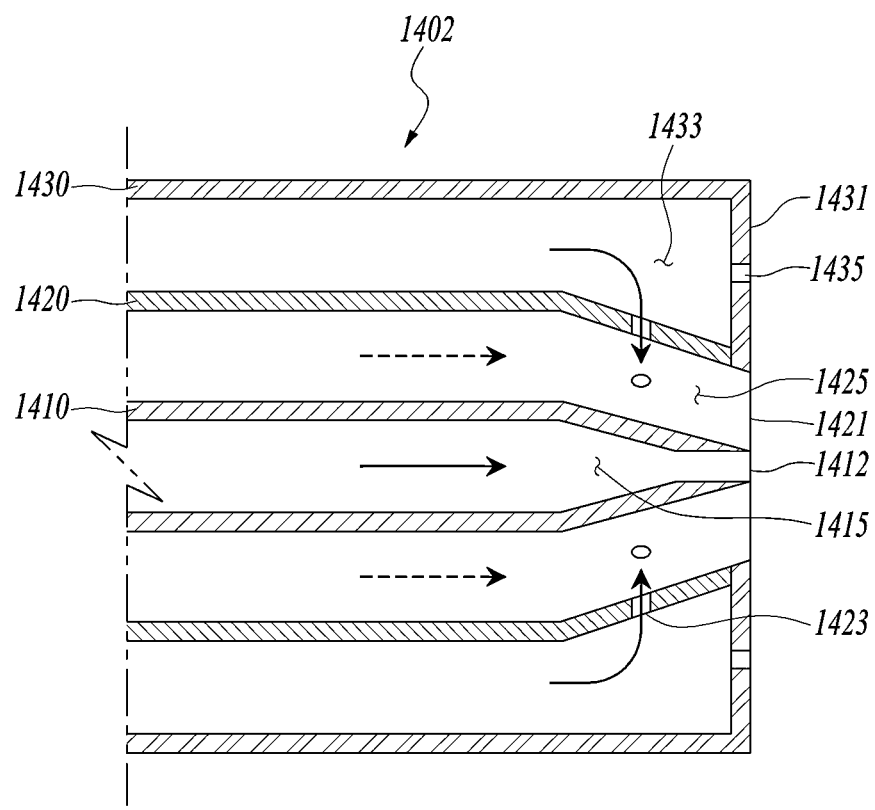
FIG. 8 is a view illustrating a nozzle cut along the longitudinal direction according to a third exemplary embodiment.

Hereinafter, a nozzle according to a third exemplary embodiment will be described. FIG. 8 is a view illustrating the nozzle cut along the longitudinal direction according to the third exemplary embodiment.

Referring to FIG. 8, because the nozzle 1402 according to the third exemplary embodiment has the same structure as the nozzle 1400 according to the first exemplary embodiment except for the third tube 1430, a redundant description of the same configuration will be omitted.

The third tube 1430 includes a passage surrounding the second tube 1420 and through which fuel flows, and a tip plate 1431 is formed at the tip of the third tube 1430. The tip plate 1431 may include auxiliary injection holes 1435 through which fuel is injected to form fine flames. The flow rate of the fuel injected through the auxiliary injection holes 1435 may be smaller than that of the fuel injected through the fine injection holes 1423.

The plurality of auxiliary injection holes 1435 are spaced apart from each other in a circumferential direction of the tip plate 1431, so that the flames formed by the fine injection holes 1423 and the main flame MF can be further protected by the flames formed by the fuel discharged from the auxiliary injection holes 1435.

Figure 9:
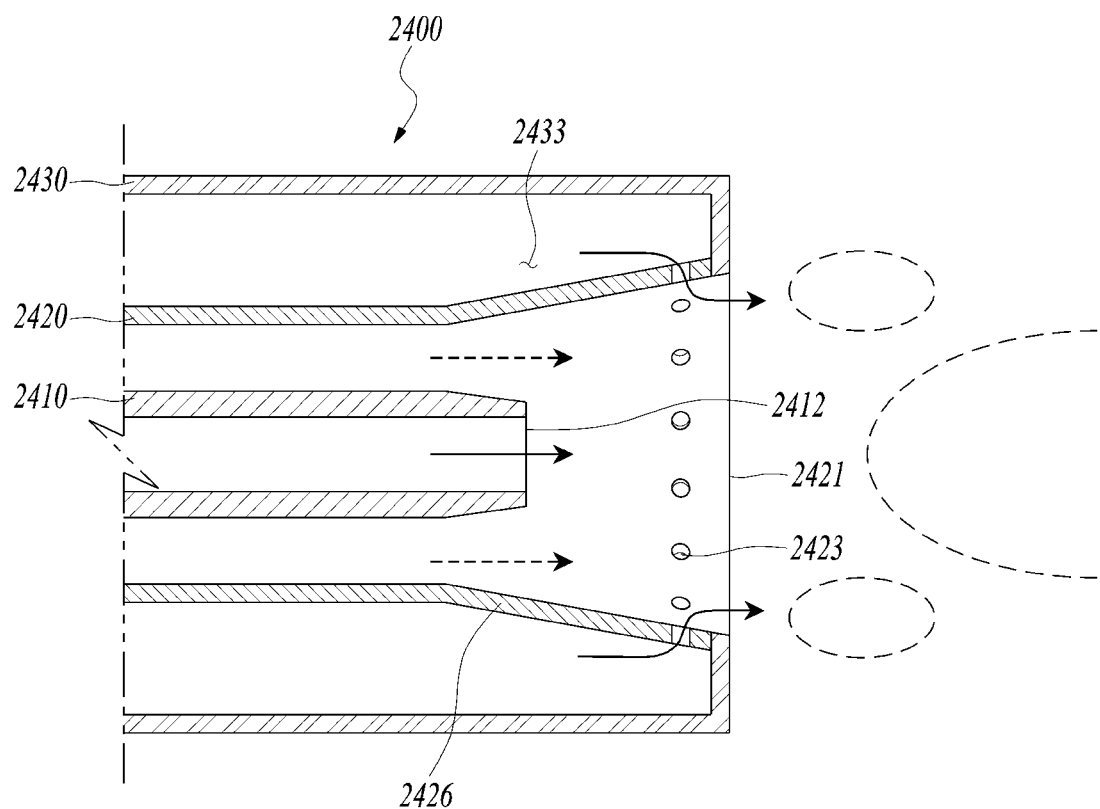
FIG. 9 is a view illustrating a nozzle cut along the longitudinal direction according to a fourth exemplary embodiment.

Hereinafter, a nozzle according to a fourth exemplary embodiment will be described. FIG. 9 is a view illustrating the nozzle cut along the longitudinal direction according to the fourth exemplary embodiment.

Referring to FIG. 9, the nozzle 2400 may include a first tube 2410 through which fuel flows, a second tube 2420 surrounding the first tube 2410, and a third tube 2430 surrounding the second tube 2420.

Fuel is supplied to and flows through the first tube 2410, and a fuel injection hole 2412 for injecting fuel is formed on a front side of the first tube 2410. Hydrogen or gas fuel containing hydrogen may be supplied to the first tube 2410, and the fuel is injected through the fuel injection hole 2412.

The second tube 2420 is provided on a front side with a premixing injection hole 2421 surrounding the first tube 2410 and into which fuel and air are injected. Air is supplied to an inside of the second tube 2420, and the fuel supplied from the third tube 2430 is mixed with air in the second tube 2420. The second tube 2420 includes a plurality of fine injection holes 2423 to inject fuel from the third tube 2430 to form fine flames. The fine injection holes 2423 are circumferentially spaced apart from each other around the second tube 2420, and may be disposed adjacent to the premixing injection hole 2421.

The second tube 2420 includes a flared extension tube 2426 extending outwardly at the tip, and the fine injection holes 2423 are formed in the extension tube 2426. The expansion tube 2426 further extends forward from the tip of the first tube 2410, and the fuel injection hole 2412 is disposed in the expansion tube 2426 to inject fuel into the expansion tube 2426. Accordingly, the air supplied through the second tube 2420, the fuel discharged from the first tube 2410, and the fuel introduced through the fine injection holes 2423 exist together in the expansion tube 2426.

On the other hand, the third tube 2430 is installed to surround the expansion tube 2426 and includes an internal injection space 2433 whose cross-sectional area gradually decreases toward the tip. The fine injection holes 2423 are formed to be connected to the injection space 2433 so that the fuel pressurized in the injection space 2433 can easily flow through the fine injection holes 2423. In addition, the fuel discharged through the fine injection holes 2423 forms fine flames to stably maintain the main flame.

Figure 10:
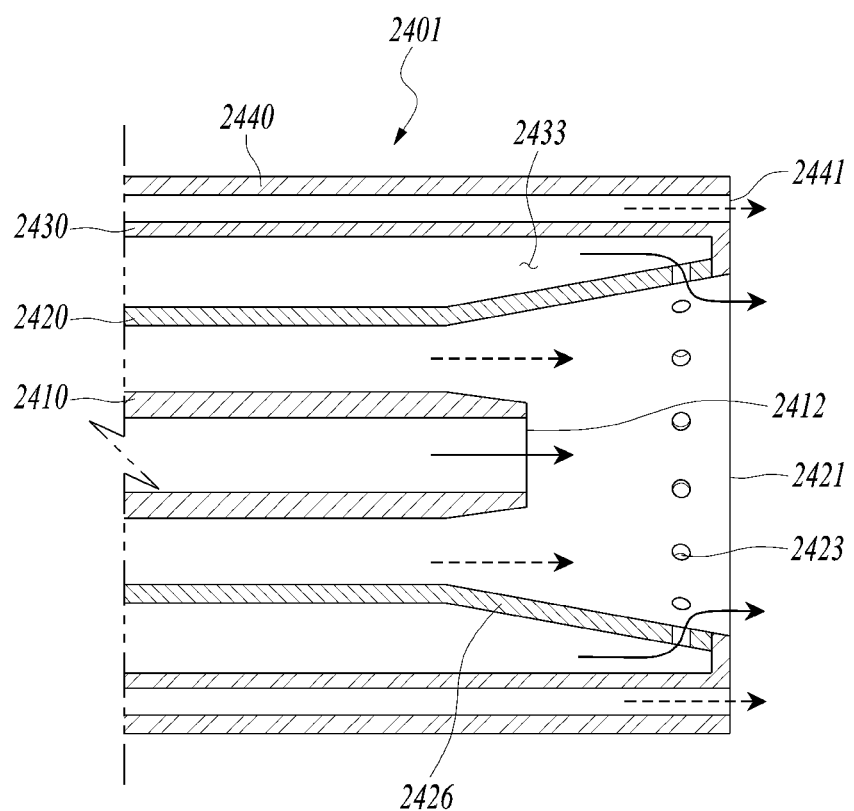
FIG. 10 is a view illustrating a nozzle cut along the longitudinal direction according to a fifth exemplary embodiment.

Hereinafter, a nozzle according to a fifth exemplary embodiment will be described. FIG. 10 is a view illustrating the nozzle cut along the longitudinal direction according to the fifth exemplary embodiment.

Referring to FIG. 10, because the nozzle 2401 according to the fifth exemplary embodiment has the same structure as the nozzle 2400 according to the fourth exemplary embodiment except for a fourth tube 2440, a redundant description of the same configuration will be omitted The nozzle 2401 further includes the fourth tube 2440 surrounding the third tube 2430. The fourth tube 2440 provides a passage through which air flows, and an air injection hole 2441 for injecting air is formed at the tip of the fourth tube 2440. The air injected through the fourth tube 2440 may cool the fourth tube 2440 and the third tube 2430 to prevent the nozzle 2401 from being thermally deteriorated.

While one or more exemplary embodiments have been described with reference to the accompanying drawings, it will be apparent to those skilled in the art that various modifications and variations can be made through addition, change, omission, or substitution of components without departing from the spirit and scope of the disclosure as set forth in the appended claims, and these modifications and changes fall within the spirit and scope of the disclosure as defined in the appended claims.

What is claimed is:

1. A nozzle fora combustor burning an air and a fuel containing a hydrogen, the nozzle comprising:
a first tube, which a first portion of the fuel flows through, having a fuel injection hole at a front end of the first tube to inject the first portion of the fuel therethrough;
a second tube, which a first portion of the air flows through, concentrically surrounding the first tube at the front end of the first tube and having a premixing injection hole at a front end of the second tube, which a second portion of the fuel and the first portion of the air are mixed and discharged, wherein an injection guide is formed by a portion of the second tube and defines an inner diameter that gradually decreases toward a tip of the second tube at the front end of the second tube from an upstream end of the injection guide to a downstream end of the injection guide; and
a third tube, which the second portion of the fuel flows through, concentrically surrounding the second tube at the front end of the second tube and being configured to inwardly inject the second portion of the fuel to an inside of the second tube via a plurality of fine injection holes, wherein each of the plurality of fine injection holes informed in the injection guide and spaced apart from each other in a circumferential direction of the second tube,
a fourth tube, which only a second portion of the air flows through, concentrically surrounding the third tube at the front end of the third tube and including a plurality of air injection holes formed at a front end of the fourth tube, wherein the third tube is formed by a solid wall such that the second portion of the fuel is not injected outwardly to an inside of the fourth tube and is not mixed with the second portion of the air and the second portion of the air is discharged via the plurality of air injection holes toward a combustion chamber and cools the nozzle, thereby preventing thermal deterioration of the nozzle.

2. The nozzle according to claim 1, wherein the first tube includes an accelerating injector, an inner diameter of the accelerating injector gradually decreasing toward a tip of the first tube at the front end of the first tube, wherein the fuel injection hole is formed.

3. The nozzle according to claim 2, wherein the injection guide surrounds the accelerating injector.

4. The nozzle according to claim 3, wherein the third tube includes an internal expansion space surrounding the injection guide and a cross-sectional area of the internal expansion gradually increases toward a tip of the third tube at the front end of the third tube.

5. A combustor comprising:
a burner having a plurality of nozzles configured to inject a fuel and an air; and
a duct assembly coupled to one side of the burner to combust a mixture of the fuel and the air and transmit a combustion gas to a turbine, wherein each of the plurality of nozzles comprising:
a first tube, which a first portion of the fuel flows through, having a fuel injection hole at a front end of the first tube to inject the first portion of the fuel therethrough;
a second tube, which a first portion of the air flows through, concentrically surrounding the first tube at the front end of the first tube and having a premixing injection hole at a front end of the second tube, which a second portion of the fuel and the first portion of the air are mixed and discharged, wherein an injection guide is formed by a portion of the second tube and defines an inner diameter that gradually decreases toward a tip of the second tube at the front end of the second tube from an upstream end of the injection guide to a downstream end of the injection guide; and
a third tube, which the second portion of the fuel flows through, concentrically surrounding the second tube at the front end of the second tube and being configured to inwardly inject the second portion of the fuel to an inside of the second tube via a plurality of fine injection holes, wherein each of the plurality of fine injection holes informed in the injection guide and spaced apart from each other in a circumferential direction of the second tube,
a fourth tube, which only a second portion of the air flows through, concentrically surrounding the third tube at the front end of the third tube and including a plurality of air injection holes formed at a front end of the fourth tube, wherein the third tube is formed by a solid wall such that the second portion of the fuel is not injected outwardly to an inside of the fourth tube and is not mixed with the second portion of the air and the second portion of the air is discharged via the plurality of air injection holes toward a combustion chamber and cools the nozzle, thereby preventing thermal deterioration of the nozzle.

6. The combustor according to claim 5, wherein the first tube includes an accelerating injector, an inner diameter of the accelerating injector gradually decreasing toward a tip of the first tube at the front end of the first tube, wherein the fuel injection hole is formed.

7. The combustor according to claim 6, wherein the injection guide surrounds the accelerating injector.

8. The combustor according to claim 7, wherein the third tube includes an internal expansion space surrounding the injection guide and a cross-sectional area of the internal expansion gradually increases toward a tip of the third tube at the front end of the third tube.

9. A gas turbine comprising:
a compressor configured to compress an air introduced from an outside;
a combustor configured to mix the compressed air from the compressor with a fuel and combust a mixture of the fuel and the compressed air to produce a high-temperature and high-pressure combustion gas; and
a turbine having a plurality of turbine blades rotated by the combustion gas produced from the combustor,
wherein the combustor comprising:
a burner having a plurality of nozzles configured to inject the fuel and the compressed air; and
a duct assembly coupled to one side of the burner to combust the mixture of the fuel and the compressed air and transmit the high-temperature and high-pressure combustion gas to a turbine,
wherein each of the plurality of nozzles comprising:

a first tube, which a first portion of the fuel flows through, having a fuel injection hole at a front end of the first tube to inject the first portion of the fuel therethrough;

a second tube, which a first portion of the compressed air flows through, concentrically surrounding the first tube at the front end of the first tube and having a premixing injection hole at a front end of the second tube, which a second portion of the fuel and the first portion of the compressed air are mixed and discharged, wherein an injection guide is formed by a portion of the second tube and defines an inner diameter that gradually decreases toward a tip of the second tube at the front end of the second tube from an upstream end of the injection guide to a downstream end of the injection guide; and a third tube, which the second portion of the fuel flows through, concentrically surrounding the second tube at the front end of the second tube and being configured to inwardly inject the second portion of the fuel to an inside of the second tube via a plurality of fine injection holes, wherein each of the plurality of fine injection holes is formed in the injection guide and spaced apart from each other in a circumferential direction of the second tube, a fourth tube, which only a second portion of the compressed air flows through, concentrically surrounding the third tube at the front end of the third tube and including a plurality of air injection holes formed at a front end of the fourth tube, wherein the third tube is formed by a solid wall such that the second portion of the fuel is not injected outwardly to an inside of the fourth tube and is not mixed with the second portion of the compressed air and the second portion of the compressed air is discharged via the plurality of air injection holes toward a combustion chamber and cools the nozzle, thereby preventing thermal deterioration of the nozzle.

10. The gas turbine according to claim 9, wherein the first tube includes an accelerating injector, an inner diameter of the accelerating injector gradually decreasing toward a tip of the first tube at the front end of the first tube, and the injection guide surrounds the accelerating injector.

* * * * *